United States Patent
Caplen et al.

(10) Patent No.: US 6,821,449 B2
(45) Date of Patent: Nov. 23, 2004

(54) TWO STEP ETCHING PROCESS FOR AN OPTICAL FIBER PREFORM

(75) Inventors: Julie E. Caplen, Neperville, IL (US); Jean-Philippe J. deSandro, Sillery (CA); Joohyun Koh, Horesheads, NY (US)

(73) Assignee: Corning Incorporated, Corning, NY (US)

( * ) Notice: Subject to any disclaimer, the term of this patent is extended or adjusted under 35 U.S.C. 154(b) by 182 days.

(21) Appl. No.: 10/319,044

(22) Filed: Dec. 12, 2002

(65) Prior Publication Data

US 2003/0150242 A1 Aug. 14, 2003

Related U.S. Application Data

(60) Provisional application No. 60/341,201, filed on Dec. 14, 2001.

(51) Int. Cl.[7] .................. C03B 37/10; C03B 37/012; C25F 3/02
(52) U.S. Cl. .................. 216/24; 216/37; 216/80; 65/428; 65/429
(58) Field of Search .................. 216/24, 80; 65/428, 65/429

(56) References Cited

U.S. PATENT DOCUMENTS

| | | |
|---|---|---|
| 4,610,708 A | 9/1986 | Sarhangi et al. ............. 65/3.12 |
| 4,668,263 A | 5/1987 | Yokota et al. ................ 65/3.11 |
| 4,793,843 A | 12/1988 | Pluijms et al. ................ 65/3.12 |
| 4,812,155 A | 3/1989 | Kyoto et al. .................. 65/3.12 |
| 4,979,971 A | 12/1990 | Kyoto et al. .................. 65/3.12 |
| 5,917,109 A | 6/1999 | Berkey ......................... 65/412 |

OTHER PUBLICATIONS

M. Liegois et al, "MCVD Preform Central Dip Reduction by Collapse Under Fluorinated Atmosphere", Journal of Non–Crystalline Solids 47, 2 (1982), pp. 247–250.

*Primary Examiner*—Allan Olsen
(74) *Attorney, Agent, or Firm*—Robert L. Carlson

(57) ABSTRACT

This invention relates to a method of preparing an optical fiber preform with the preform having a uniform refractive index profile for the deposited oxide material that ultimately forms the optical fiber core. One embodiment of the invention relates to a process for preparing an optical fiber preform comprising the steps of etching a substrate a first time to remove a portion of a deposited oxide material from the preform by using a gas comprising an etchant gas containing fluorine at a sufficient temperature and gas concentration to create a fluorine contamination layer in the remaining deposited oxide material; and etching the preform a second time using a gas comprising an etchant gas containing fluorine at a sufficient temperature and gas concentration to remove the fluorine contamination layer without any substantial further fluorine contamination of the remaining deposited oxide material. Further embodiments relate to similar processes.

17 Claims, 2 Drawing Sheets

TWO STEP ETCHING PROCESS FOR AN OPTICAL FIBER PREFORM

CROSS-REFERENCE TO RELATED APPLICATIONS

This application claims the benefit of priority under 35 U.S.C. § 119(3) of U.S. Provisional Application Ser. No. 60/341,201, filed on Dec. 14, 2001.

BACKGROUND OF THE INVENTION

FIELD OF THE INVENTION

This invention relates to a method of preparing a optical fiber preform with the preform having a uniform refractive index profile for the deposition material that ultimately forms the core of the optical fiber. More particularly, the invention relates to a method of removing or reducing non-uniform regions in the deposition material on the surface of the preform formed during the processing of the preform or by exposure to certain environmental conditions, which result in the preform having a uniform refractive index profile for the deposition material that ultimately forms the core of the optical fiber.

TECHNOLOGY BACKGROUND

Optical fibers have acquired an increasingly important role in the field of communications, frequently replacing existing copper wires. This form of transmission is done by sending a beam of light through an optical fiber. Interference with the light beam or its partial loss during transmission must be at a minimum to make the use of optical fibers a successful communications technology. The manufacture of optical fibers used for communications is a complicated and time intensive process involving many steps. Each step is another point in the manufacturing process in which defects can be introduced into the product.

Typically an optical fiber consists of a core and cladding. The core is used to propagate the light rays, and the cladding is used to contain (through reflection) the rays within the core. Defects in the core (and materials used to form the core) are critical since these defects can hinder the propagation of the light rays resulting in loss or attenuation of the light through the fiber and therefore a decrease in the distance light can be propagated without being amplified. There are a number of steps in the manufacturing of an optical fiber which are used to reduce or minimize defects in the fiber, and in particular in the deposition material to be used for the core of the fiber.

Optical fibers can be formed from preforms by drawing a fiber therefrom. Preforms can take the form of a hollow, tube shaped glass. Such preforms can be made by a process in which a vitreous material is deposited on an internal and/or external surface of a glass tube. The number of layers of the deposited material, the composition of the deposited material and the surface(s) of the glass tube on which the material is deposited are determined based on the type of fiber to be manufactured include but are not limited to step-indexed multimode, graded-index multimode, step-index single-mode, dispersion-shifted single-mode, and dispersion-flattened single-mode. Examples of processes suitable for forming a preform include the outside vapor deposition (OVD), vapor axial deposition (VAD), and inside vapor deposition processes such as modified chemical vapor deposition (MCVD) and plasma assisted chemical vapor deposition (PCVD). Once a material is deposited on a glass tube with the desired profile, an optical fiber can be drawn from the preform after the preform is collapsed into a solid rod. Collapsing the preform presents an important advantage over other processes since solid preforms can be stored indefinitely without contaminating the inner layers, which will become the light propagating cores of the optical fibers. Collapsing the preform, however, also presents a drawback in that during the collapsing step volatile dopants in the deposited material such as germanium are desorbed or released from the material. These dopant molecules are then either re-deposited at another location or transported out of the preform. The transport and/or re-deposition of the dopants out of the material deposited on the preform results in a refractive index deviation at the center of the core of the optical fibers pulled from such a preform. The refractive index deviation takes the form of spikes or dips.

One of the steps in manufacturing an optical fiber is to remove defects such as impurities or depleted regions at or near the surface of the deposited material including those caused by environmental contamination such as by for example re-wetting or by depletion of the dopant from the surface of the deposited material. This step which is commonly employed in inside vapor deposition processes such as MCVD and PCVD involves etching the inner surface of the preform. The etching can take place on a un-collapsed preform or on a partially collapsed preform. During the etching step, etchant gases containing fluorine are used to remove deposited material from the preform surface. It has been found, however that if the etching takes place at too high a temperature or where the concentration of the gas containing fluorine is too high, then even if the original defects are removed through etching, further defects from fluorine contamination can be incorporated into the surface of the deposited material. This may result in a decrease in the refractive index in the core of the fiber, but certainly not in an elimination of that defect. To solve this problem, it was found by others that certain combinations of lowering the etching temperature, using less aggressive etchant gases and lowering the concentration of those less aggressive etchant gases can reduced or eliminated fluorine contamination during etching. This, however, results in a slower, time consuming processing step which is also less desirable.

SUMMARY OF THE INVENTION

This present invention is directed to a method of preparing an optical fiber preform such that the preform has a more uniform refractive index profile across the deposited glass material that ultimately forms the core of the optical fiber. This method preferably results in the removal or reduction of non-uniformly doped regions in the deposited material on the surface or centerline of the preform. Such non-uniformly doped regions can be formed during the processing of the preform, or by exposure to certain environmental conditions, which result in the preform having a uniform refractive index profile across the deposited material that ultimately forms the core of the optical fiber.

In one embodiment, an optical fiber preform is etched a first time to remove a portion of a deposited oxide material from the preform by using a gas comprising an etchant gas containing fluorine at a sufficient temperature and gas concentration to create a fluorine contamination layer in the remaining oxide material. The preform is then etched a second time using a gas comprising an etchant gas at a sufficient temperature and gas concentration to remove the fluorine contamination layer which is present in the remaining oxide material, without any substantial further fluorine contamination of the remaining oxide material. Preferably the second etchant gas also contains fluorine.

In another embodiment, an optical fiber preform is prepared which comprises an inner and outer surface and comprises at least one oxide material deposited on the inner surface of the preform. The deposited oxide material comprises a dopant. The glass preform is collapsed under conditions which result in the depletion of some of the dopant out of the deposited oxide material for a distance from the inside surface. The glass preform is subsequently etched a first time to remove part or all of a dopant depleted layer from the deposited oxide material using a gas comprising an etchant gas containing fluorine at a sufficient temperature and gas concentration to create a fluorine contamination layer in the remaining deposited oxide material. The glass preform is etched a second time using a gas comprising an etchant gas containing fluorine at a sufficient temperature and gas concentration to remove any remaining dopant depleted layer and the fluorine contamination layer without any substantial further fluorine contamination of the remaining deposited oxide material.

In still another embodiment, an optical fiber preform is formed via a process which comprises the steps of a) partially collapsing a glass tube with an inner and outer surface and comprising a deposited oxide material on the inside of the tube, the deposited oxide material comprising a dopant, under conditions which results in the depletion of some or all of the dopant from a region of the deposited oxide material for a distance from the inner surface; b) flowing a mixture of gas comprising an etchant gas containing fluorine over the inner surface of the glass tube at an etchant gas flow rate of greater than about 65 sccm and a temperature of less than 1700° C.; and c) flowing a second mixture of gas comprising an etchant gas containing fluorine at a sufficient temperature and gas concentration to remove any remaining dopant depleted layer and fluorine contamination resulting from step b) without any substantial further fluorine contamination of the remaining deposited oxide material.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings help to better illustrate the invention, and together with the description serve to explain the principles and operation of the invention.

DETAILED DESCRIPTION OF THE INVENTION

The present invention relates to a process of preparing a fully collapsed optical fiber preform without substantial refractive index variations in oxide materials deposited on the preform. Substantial refractive index variations include spikes, dips and/or plateaus in the refractive index profile of the cane, which can occur due to dopant migration, which occurs during hole closure or consolidation. These unintended variations in dopant concentration can cause increased attenuation, polarization mode dispersion and other fiber properties (i.e., cutoff, N.A., . . . ) in the optical fiber produced from the resultant optical fiber preform. The process for preparing an optical fiber preform to remove the refractive index variations caused by these dopant variations involves a two-step etching process.

Figure 1:
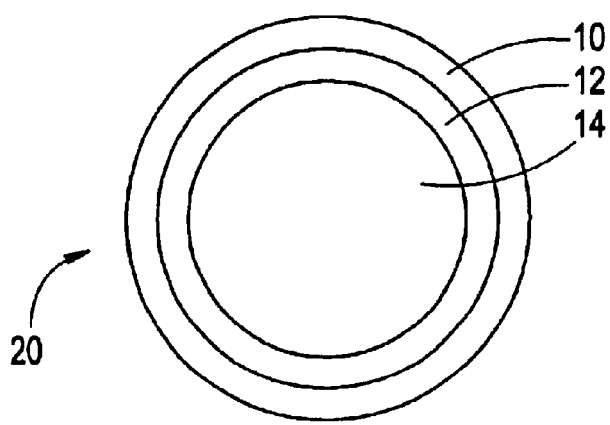
FIG. 1 is a schematic of the cross section of a glass tube with a deposited material.

Preferably, the present invention can be used to help process both single-mode and multi-mode preforms for optical fibers manufactured by processes in which at least one vitreous, crystalline or semi-crystalline oxide material is deposited on the preform using conventional deposition processes. More preferably, as represented by FIG. 1 the present invention is used to prepare deposited oxide materials 12 which are applied to the inside of the glass or quartz preform tube 10 (e.g., using the modified chemical vapor deposition (MCVD) process and plasma chemical vapor deposition (PCVD) process) resulting in a hole or opening 14 in the preform. However, it is envisioned that this process could be used to etch different core materials for a variety of fiber applications. Preferably, the preforms prior to collapsing and deposition of oxide material have an inner diameter of from about 10 to about 33 mm, an outer diameter of from about 11 to about 43 mm, and a wall thickness of from about 1 to about 10 mm. The deposited material 12 comprises at least one layer of oxide material, but could comprise for example, up to several hundred layers of oxide material (e.g., preforms for graded index multimode fibers are made by depositing up to several hundred layers of deposited vitreous oxide to approximate a smooth curve). The thickness of the deposited material and the number of layers (and their thickness and composition) to the deposited material depends on the type of optical fiber for which the preform is being used including but not limited to for example step-index multimode, graded-index multimode, step-index single-mode, dispersion shifted single-mode, or dispersion flattened single-mode fibers. The deposited oxide material thickness is, however, generally from about 10 to about 2000 $\mu$m.

Figure 2:
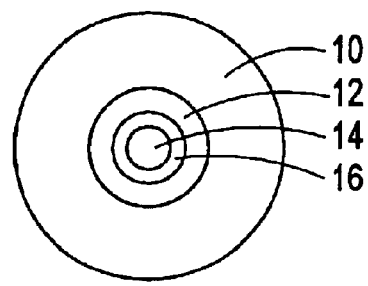
FIG. 2 is a schematic of the cross section of a partially collapsed, non-etched preform with a dopant depleted region.

The preform or glass tube 20 can be used to draw an optical fiber. Preferably, the tube 20 is collapsed prior to being drawn into fiber. The preform is preferably collapsed at temperatures at or above the softening point of the glass and the deposited material. During the step of collapsing the preform (glass tube), as shown by the schematic in FIG. 2, in addition to surface defects that may exist in the deposited material near the surface from the manufacturing and processing steps, highly volatile components (or dopants) of the deposited material may evaporate or migrate out of the deposited material(s) 12 employed. These volatilized species may then, due to the high collapsing temperatures, be re-deposited elsewhere on the deposited material thereby creating a region 16 of depleted dopant at the surface of the deposited material and/or more highly doped regions resulting in spike and/or dips in the refractive index profile of the core of the preform. These highly volatile components or dopants are known to those skilled in the art. Among them is germanium dioxide ($GeO_2$). The exact depth of the depletion of the dopant will depend on the processing conditions required to collapse or partially collapse the preform.

Preferably, it is during the process for collapsing the preform, or after partially collapsing the preform that the surface of the deposited oxide material is etched to remove any defects at or near the surface from the oxide material prior to completely collapsing the preform. By etching the preform during the collapsing process or after partially collapsing the preform (rather than prior to entirely collapsing the preform), the risk of further defects being incorporated into the deposited material is lowered. More preferably, the preform is partially collapsed prior to beginning the etching process. When the preform is partially collapsed prior to beginning the etching process, preferably, the inner diameter of the partially collapsed preform is less than about 5 mm, more preferably less than about 3 mm, and most preferably from about 0.5 to about 2 mm. Also, preferably the inner diameter along the entire length of the axis of the preform (not shown) is substantially uniform to help maintain a uniform etch across the preform. By substantially uniform we mean that the inner diameter of the preform does not vary by more that 5% along the entire length of the axis of the preform.

The process of the present invention preferably comprises the steps of first etching a preform with a deposited oxide material to remove a portion of an oxide material from the preform by using a gas comprising a first etchant gas containing fluorine at a sufficient temperature and gas concentration to create a fluorine contamination layer in the remaining oxide material. This first etch step involves flowing a gas across the surface of the deposited oxide material to remove a portion of that material. The gas comprises an etchant gas containing fluorine. An etchant gas is a gas, which under the appropriate conditions (e.g., temperature and concentration) is capable of removing crystalline or vitreous oxide materials through chemical action. Examples of preferred first etchant gases include but are not limited $CF_4$, $SF_6$, $NF_3$, $C_2F_6$, $C_4F_8$, $CHF_3$, $CClF_3$, $CCl_2F_2$, $CCl_3F$, $SiF_4$ and combinations particularly preferred family of etchant gas is fluorine based gas compound. More preferably, the first etchant gas is selected from the group consisting of $CF_4$, $SF_6$, $NF_3$, $C_2F_6$, $C_4F_8$, $CHF_3$ $SiF_4$ and combinations thereof, and most preferably is $SF_6$. The gas can further comprise additional non-fluorinated gases which can be used in combination with the etchant gas. One such preferred additional gas is oxygen.

The concentration of the etchant gas and the temperature at which the gas flows across the surface of the oxide material affects the rate of removal of the deposited oxide material and/or contaminated region by the etchant gas. Preferably, the combination of the temperature and etchant gas concentration are sufficient to allow for a rapid etching rate (removal rate) of the deposited oxide material, which optimally results in decreasing the processing time of the preform. Preferably, the etchant gas used for the first etching step has a flow rate of at least about 65 standard cubic centimeters per minute ("sccm") across the surface of the deposited oxide material, more preferably of at least about 80 sccm, and most preferably of at least about 90 sccm. If the gas comprises an additional gas such as oxygen, preferably the flow rate of the additional gas is from about 100 to about 300 sccm, more preferably from about 150 to about 250 sccm and most preferably, from about 190 to about 210 sccm. Preferably, the temperature of the first etching step is less than about 1700° C., more preferably less than about 1600° C. and most preferably less than about 1550° C.

With rapid removal rates, the fluorine tends to diffuse into the remaining deposited oxide material more rapidly than the oxide material can be removed through etching. This creates a contamination layer in the deposited oxide material of fluorine, which in turn changes the refractive index of the remaining oxide material, and therefore the resultant preform, and ultimately of the optical fiber drawn from this material. The contamination layer is the depth of any substantial contamination by fluorine in the oxide material caused by the etchant gases. Substantial contamination is as defined in this application as the area in the oxide material with any noticeable change in refractive index as a result of contamination by fluorine caused by the etchant gases in the oxide material. The contamination layer may be defined by measuring the change in refractive index of the oxide material (if the oxide material is a vitreous material and can be measured). The reason for a second etching step is the need to remove at least a portion, and preferably all of the contamination layer, and likewise the area of changed refractive index. Preferably, the depth of any substantial contamination by fluorine in the oxide material at the end of the first etching step is less than about 10% of the thickness of the oxide material as deposited, more preferably less than about 5% and most preferably less than about 1%. More preferably, the first etching step is controlled through time, temperature and concentration of the etchant gas to result in the contamination layer (substantial fluorine diffusion) ending at the desired etch depth (e.g., where the fluorine contamination ends at the same depth as that of the substantial dopant depletion).

The process for preparing the optical fiber preform further comprises the step of etching the preform a second time using a gas comprising a second etchant gas containing fluorine at a sufficient temperature and gas concentration to remove the fluorine contamination layer without any substantial further fluorine contamination of the further remaining deposited oxide material. The second etch step again involves flowing a gas across the surface of the deposited oxide material to remove a portion of that material. Again, the gas comprises a second etchant gas containing fluorine. Examples of second etchant gases which can be used in the second etching step are the same as those used for the first step, with the exception that most preferably the second etchant gas is $C_2F_6$. In addition, preferably the gas can further comprise additional non-fluorinated gases, which can be used in combination (and mixed) with the etchant gas. More preferably, the additional gas is oxygen.

In the second etch step instead of using a concentration of etchant gas and temperature whereby the oxide material is removed at such a rapid rate that contamination occurs by fluorine diffusion into the deposited oxide material, the etching step is controlled by temperature, and concentration of the etchant gas so oxide material is removed without any further contamination by fluorine. Therefore, the etchant gas containing fluorine is applied to the preform surface at a sufficient temperature and gas concentration to remove the fluorine contamination layer without any substantial further fluorine contamination of the remaining oxide material. While the rate of the removal of deposited oxide material is much slower during this step, preferably in combination with the first step this process allows for a more rapid etching process without further defects being incorporated into the deposited oxide material than was previously possible.

Preferably, the second etchant gas used for the second etching step has a flow rate of less than about 60 standard cubic centimeters per minute ("sccm") across the surface of the deposited oxide material, more preferably of less than about 10 sccm, and most preferably of less than about 5 sccm. If the gas comprises an additional gas such as oxygen, preferably the flow rate of the additional gas is from about 100 to about 300 sccm, more preferably from about 150 to about 250 sccm and most preferably, from about 190 to about 210 sccm. Preferably, the temperature of the second etching step is greater than about 1650° C., more preferably greater than about 1750° C. and most preferably greater than about 1850° C.

Finally, if the preform is being collapsed during the etching process then preferably the process is organized in such a way as to allow a complete removal of any defect at the surface of the preform that would affect the light transmission of the optical fiber produced from such preform prior to completely collapsing the preform into a glass rod, which then can be drawn into optical fibers. If the preform is partially collapsed then the process further includes the step of completing the collapse of the preform into a glass rod, which then can be drawn into optical fibers.

EXAMPLES

The present invention will be further clarified by the following examples, which are intended to be exemplary of the invention.

Example 1
Un-Etched Preform Made by PCVD Fabrication Method

A step index preform was manufactured from a high purity fused silica glass tube—2 meters in length by 25 mm OD by 21 mm ID (sold under the tradename F300 by Heraeus Amersil of Duluth, GE). Glass layers for the preform were deposited on the inner surface of the glass tube by a PCVD process to form the preform having a central duct. The deposited material had a thickness of 1 mm and the composition was a $SiO_2$ with 3.4 mol % of $GeO_2$. The preform with deposited oxide material was heated to 2200° C., and collapsed into a glass rod using 3 collapsing passes. The preform was rotated on a lathe during the collapsing and etching processes at 20–30 rpm. The collapsing passes were conducted using an externally traversing torch to completely collapse the central duct. The entire process for collapsing the preform took approximately 1.5 hours, however, this can vary depending on the tube diameter, type of material deposited and the length of the tube.

Figure 3:
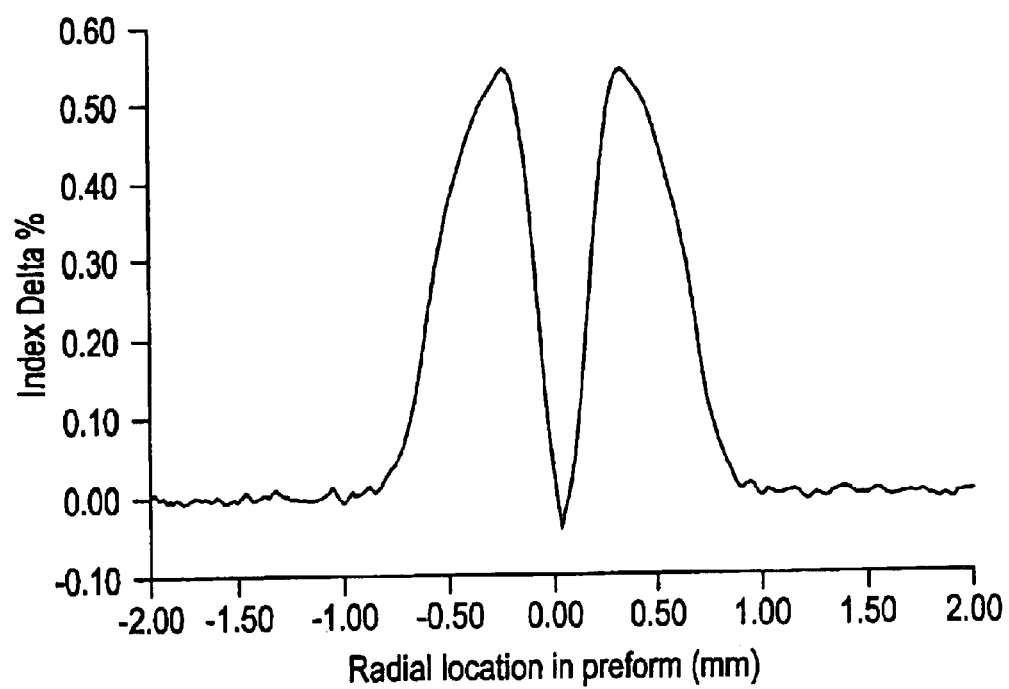
FIG. 3 is a graph showing the radial refractive index profile of a glass rod made from a collapsed, non-etched preform with a dopant depleted region.

FIG. 3 is a graph showing the radial refractive index profile of a solid glass rod made as described above formed from a collapsed, non-etched preform. Although the appropriate amount of $GeO_2$ was applied to form a step index profile because of the hole closure step, a $GeO_2$ dopant depleted region was formed along the centerline. It is apparent from the Figure that there is a large dip in the refractive index along the centerline of the cane due to $GeO_2$ depletion during the collapsing process.

Example 2
Preform Made by PCVD Fabrication Method with Single Etch Step

A step index preform similar to that used in Example 1 was produced using essentially the same materials and equipment under the same conditions listed in Example 1. After deposition, the preform continued to rotate on a lathe with a spindle speed of 20 rpm. The preform was heated, and partially collapsed using 3 collapsing passes. These collapsing passes were conducted using an externally traversing torch. The traverse speeds of the torch for the collapsing passes were 2.1 cm/min for the first pass, 1.3 cm/min for the second pass and 1.0 cm/min for the third pass. The collapsing temperatures for the 3 passes were 2200° C., 2200° C. and 2205° C. respectively. During the collapsing passes, oxygen flowed through the collapsing preform at approximately 2100 sccm. The internal pressure in the preform during collapse was kept at slightly above the atmospheric pressure at 764.4 Torr. The inside diameter of the preform was approximately 1 mm at the end of the first three collapsing passes.

The region of glass with depleted dopants was now etched. The partially collapsed preform was etched by flowing an etchant gas comprising a mixture of 90 sccm of $SF_6$ and 200 sccm of $O_2$ through the central duct of the preform while it was heated at a temperature of 1550° C. The traverse speed of the torch for the etching step was 7.2 cm/min. After the etching step was completed the preform was completely collapsed using a sealing pass. The traverse speed of the torch during the sealing step was from 0.3 to 0.8 cm/min at a temperature of 2205° C. The entire process for collapsing and etching the preform took approximately 2.5 hours, however, this can vary depending on the tube diameter, type of material deposited and the length of the tube.

Figure 4:
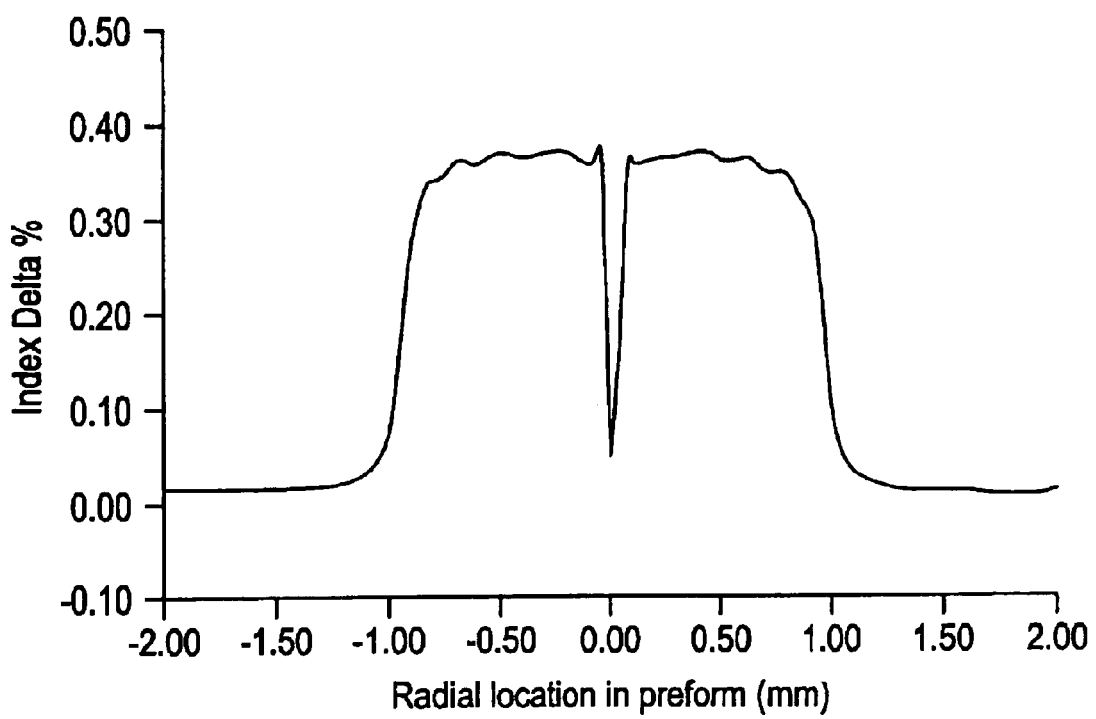
FIG. 4 is a graph showing the radial refractive index profile of a glass rod made from a collapsed, aggressively etched preform with a $F^-$ contaminated region.

FIG. 4 is a graph showing the radial refractive index profile of a cane produced from a collapsed aggressively etched preform with a $F^-$ contaminated region. While it appears that the dopant depleted region has been removed, there still remains a dip in the refractive index along the centerline of the cane due to fluorine diffusion into the deposited material during the etching process.

Example 3
Preform Made by PCVD Fabrication Method with Double Etch Step

Again, a preform similar to that used in Example 1 was produced using essentially the same materials and equipment under the same conditions listed in Example 1. The preform was mounted on a lathe with a spindle speed of 20 rpm. The preform was heated to be partially collapsed using 3 collapsing passes. These collapsing passes were conducted using an externally traversing torch. The traverse speeds of the torch for the collapsing passes were 2.1 cm/min for the first pass, 1.3 cm/min for the second pass and 1.0 cm/min for the third pass. The collapsing temperatures for the 3 passes were 2200° C., 2200° C. and 2205° C. respectively. During the collapsing passes oxygen flowed through the collapsing preform at between approximately 2000 and 2600 sccm. The inside diameter of the preform was 1 mm at the end of the first three collapsing passes.

The region of glass with depleted dopants was then etched in two steps. The partially collapsed preform was first etched by flowing an etchant gas comprising a mixture of 90 sccm of $SF_6$ and 200 sccm of $O_2$ through the central duct of the preform while it is heated at a temperature of 1550° C. The traverse speed of the torch for the etching step was 7.2 cm/min. The preform was etched a second time by flowing an etchant gas comprising a mixture of 5 sccm of $C_2F_6$ and 200 sccm of $O_2$ through the central duct of the preform while it is heated at a temperature of 1650° C. The traverse speed of the torch for the second etching step was also 7.2 cm/min. After the etching step was completed the preform was completely collapsed using a sealing pass. The traverse speed of the torch during the sealing step was from 0.3 to 0.8 cm/min. The entire process for collapsing and etching the preform took approximately 2.5 hours, however, this can vary depending on the tube diameter, the type of material deposited and the length of the tube.

Figure 5:
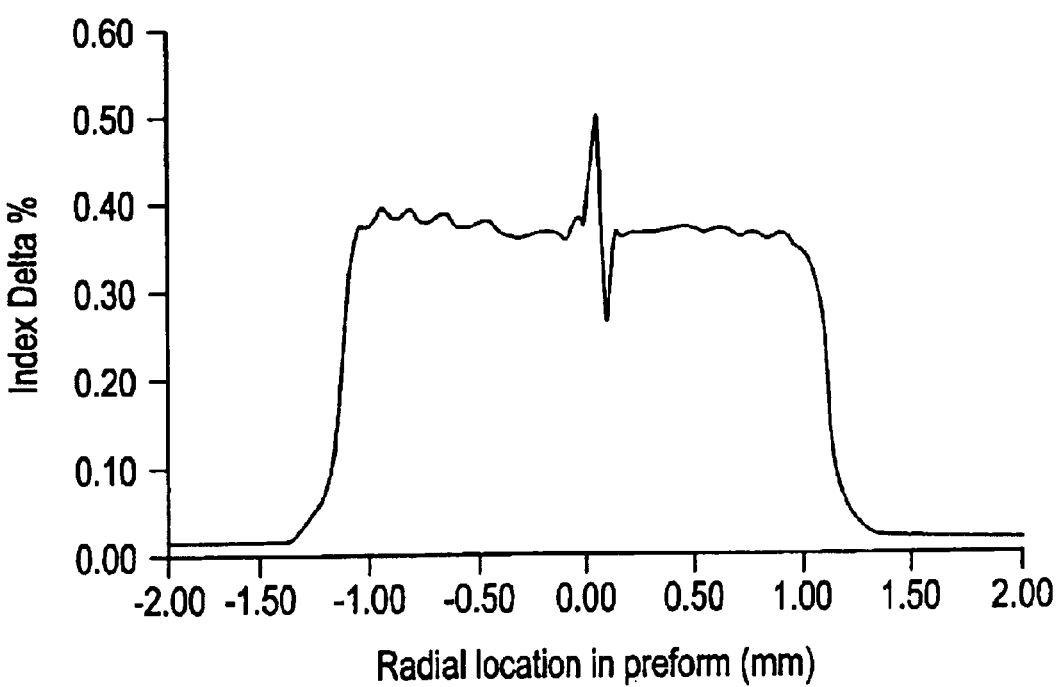
FIG. 5 is a graph showing the radial refractive index profile of a glass rod made from a collapsed preform etched according to the present invention.

FIG. 5 is a graph showing the radial refractive index profile of a cane produced from a collapsed preform that under went a two-step etching process wherein the partially collapsed preform was aggressively etched during the first step, and was mildly etched during the second step to remove the $F^-$ contaminated region created by the first step. The Figure shows essentially no dip in the refractive index along the centerline of the cane.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A process for preparing an optical fiber preform comprising the steps of:
   a) etching an optical fiber preform a first time to remove a portion of an oxide material deposited on the preform by using a gas comprising a first etchant gas containing fluorine at a sufficient temperature and gas concentration to create a fluorine contamination layer in the remaining oxide material; and
   b) etching the preform a second time using a gas comprising a second etchant gas containing fluorine at a sufficient temperature and gas concentration to remove the fluorine contamination layer without any substantial further fluorine contamination of the remaining deposited oxide material.

2. The process in claim 1, wherein the deposited oxide material is vitreous.

3. The process in claim 2, wherein the preform is a partially collapsed prior to etching, the preform having an inner and outer surface and the deposited oxide material forms the inner surface.

4. The process in claim 3, wherein the preform is partially collapsed before etching and has an inner diameter of less than about 10 mm.

5. The process in claim 3, wherein the temperature in the first etch step is less than about 1700° C.

6. The process in claim 5, wherein the temperature in the second etch step is greater than about 1650° C.

7. The process in claim 6, wherein the temperature in the first etch step is less than 1600° C.

8. The process in claim 7, wherein the first etchant gas has a flow rate of greater than about 65 sccm.

9. The process in claim 8, wherein the first and second etchant gases are selected from the group consisting of $CF_4$, $SF_6$, $NF_3$, $C_2F_6$, $C_4F_8$, $CHF_3$, and combinations thereof.

10. The process in claim 8, wherein the first etchant gas is $SF_6$ and the second etchant gas is $C_2F_6$.

11. A process for preparing an optical fiber preform comprising the steps of:
    a) partially collapsing a glass tube, with an inner and outer surface comprising at least one oxide material deposited on the inside of the tube, the oxide material comprising a dopant, under conditions which results in the depletion of some of the dopant out of the deposited oxide material for a distance from the inside surface;
    b) etching the glass tube a first time to remove part or all of the dopant depleted layer from the deposited oxide material using a gas comprising a first etchant gas containing fluorine at a sufficient temperature and gas concentration to create a fluorine contamination layer in the remaining deposited oxide material; and
    c) etching the partially collapsed glass tube a second time using a gas comprising a second etchant gas at a sufficient temperature and gas concentration to remove any remaining dopant depleted layer and at least a portion of the fluorine contamination layer.

12. The process in claim 11, wherein the deposited oxide material is vitreous.

13. The process in claim 12, wherein the partially collapsed glass tube has an inner diameter of less than about 5 mm.

14. The process in claim 12, wherein the temperature in the first etch step is at less than about 1700° C.

15. The process in claim 14, wherein the temperature in the second etch step is at greater than about 1650° C.

16. The process in claim 15, wherein the first and second etchant gases are selected from the group consisting of $CF_4$, $SF_6$, $NF_3$, $C_2F_6$, $C_4F_8$, $CHF_3$, and combinations thereof.

17. The process in claim 15, wherein the first etchant gas is $SF_6$ and the second etchant gas is $C_2F_6$.

* * * * *